United States Patent [19]

Devensky et al.

[11] Patent Number: 4,647,926
[45] Date of Patent: Mar. 3, 1987

[54] WARNING SYSTEM FOR MICROWAVE LANDING SYSTEM AIRBORNE RECEIVER

[75] Inventors: Walter L. Devensky, Boca Raton; Wayne H. Martin, Sunrise, both of Fla.

[73] Assignee: Allied Corporation, Morristown, N.J.

[21] Appl. No.: 635,328

[22] Filed: Jul. 27, 1984

[51] Int. Cl.$^4$ .................. G08G 5/00; G06M 3/00
[52] U.S. Cl. .................. 340/947; 364/429; 377/28; 377/52; 377/107; 342/372; 342/7
[58] Field of Search ............ 340/947, 948, 952, 511, 340/976; 343/410, 413, 5 LS, 5 GC, 372, 420, 6.5 R; 364/428, 429, 449; 377/28, 30, 33, 39, 45, 52, 107; 73/178 R, 178 T; 244/1 R

[56] References Cited

U.S. PATENT DOCUMENTS

| | | | |
|---|---|---|---|
| 3,716,791 | 2/1973 | Harries et al. | 343/420 |
| 3,729,737 | 4/1973 | Asam | 343/5 LS |
| 3,990,014 | 11/1976 | Hakozaki | 377/52 |
| 4,115,687 | 9/1978 | Boese et al. | 377/52 |
| 4,306,239 | 12/1981 | Ehein | 343/372 |
| 4,385,383 | 5/1983 | Karchevski | 377/28 |
| 4,414,678 | 11/1983 | Baumgartner | 377/28 |
| 4,467,326 | 8/1984 | Charas et al. | 343/6.5 R |
| 4,509,183 | 4/1985 | Wright | 377/107 |
| 4,532,517 | 7/1985 | LaBerge et al. | 343/372 |

FOREIGN PATENT DOCUMENTS

| | | | |
|---|---|---|---|
| WO81/01747 | 6/1981 | PCT Int'l Appl. | 343/6.5 R |
| 2052911A | 1/1981 | United Kingdom | 343/5 LS |

OTHER PUBLICATIONS

"Microwave Landing System, The New International Standard" by H. W. Redlien and R. J. Kelly, published in Advances in Electronics and Electron Physics, vol. 57, pp. 311–410; Academic Press, Inc. 1981.

*Primary Examiner*—James L. Rowland
*Assistant Examiner*—Brent A. Swarthout
*Attorney, Agent, or Firm*—Bruce L. Lamb; Robert M. Trepp

[57] ABSTRACT

A system to provide warning whenever unreliable data is being received by an airborne receiver for a microwave landing system. The received data is tested against certain criteria to determine validity. The received data is also tested to determine whether it was received via a direct path or via a multipath reflection. A validity counter records the percentage of valid data received. A multipath counter records the length of time data is received via direct path relative to the length of time data is received via multipath. Both counters control warning flags to cause a warning to be generated whenever the counter contents are below threshold values. The validity counter is set to an upper limit when its count crosses the threshold in a positive direction and is set to a negative limit when its count crosses the threshold in a negative direction. A constant number is added to the count of the multipath counter whenever its count crosses the threshold in a positive direction and the count is cleared completely whenever the count crosses the threshold in a negative direction.

3 Claims, 10 Drawing Figures

FIG. 1A  SEQUENCE #1

FIG. 1B  SEQUENCE #2

WARNING SYSTEM FOR MICROWAVE LANDING SYSTEM AIRBORNE RECEIVER

BACKGROUND OF THE INVENTION

The present invention relates to a warning system for an airborne receiver in a Microwave Landing System. More particularly, it relates to a system for alerting an aircraft pilot to conditions under which the output signals produced by an airborne receiver of a microwave landing system are unsafe to utilize for aircraft guidance during approach to an airport and landing of the aircraft.

The Microwave Landing System (MLS) is a new international standard navigational aid intended to replace the fixed beam Instrument Landing System (ILS) currently in use throughout the world to provide guidance signals to an aircraft during approach and landing under low visibility conditions.

The ILS operates to provide lateral guidance signals, often referred to as localizer or azimuth guidance signals, by projecting a pair of continuous beams of a carrier frequency in the 110 MHz band in the direction of the approach path to an airport runway. The axes of the beams are skewed to the right and to the left of the runway centerline so that a receiver located thereon will detect equal strength signals from both beams while a receiver displaced laterally from the runway centerline will detect a higher strength signal from the beam having its axis nearer the receiver than from the farther beam. The beams are identified as to right or left sector coverage by modulating the carrier of one beam with a 90 Hz tone and the carrier of the other beam with a 150 Hz tone.

The ILS operates in a similar fashion to provide vertical guidance signals, often referred to as glide slope or elevation signals, except that there the beam carrier frequencies are in the 330 MHz band and the beam axes are inclined upwardly at slightly different angles from the runway surface to define a plane of equal strength signals from both beams which intersects the runway surface at a fixed glide slope angle, usually 3 degrees.

The MLS operates to provide lateral or azimuth guidance signals by projecting a fan shaped beam which is narrow in the horizontal plane and broad in the vertical plane generally along the direction of approach to the runway. Rather than being fixed in direction, as are the ILS beams, the MLS azimuth beam scans at a predetermined constant rate "TO" and "FRO" between limits of as high as ±60 degrees about the runway centerline. Knowing the beam scan rate, the angular displacement of a receiver from the runway centerline can be calculated by measurement of the time elapsing between detection at the receiver of signals from the "TO" beam scan and detection of signals from the next following "FRO" beam scan.

The MLS operates to provide elevation, or glide slope guidance signals in a similar manner except that there the fan shaped beam is broad in the horizontal plane and narrow in the vertical plane. The elevation beam is scanned vertically "TO" and "FRO" between limits of from +0.9 degree to as high as +30 degrees.

Apart from the manner in which guidance signals are generated, other substantial differences exist between ILS and MLS. In ILS the localizer and glide slope beams are fixed in space and are continuously transmitted on different carrier frequencies. In MLS both the azimuth and elevation beams are scanned and are transmitted on the same carrier frequency in the microwave C-band (5000 MHz). The MLS azimuth and elevation beams are time multiplexed in accordance with a standard signal format which includes provisions for transmitting much useful information from the system ground equipment to the aircraft being served, in addition to the vital proportional guidance signals.

Time multiplexing and beam scanning, complicates a warning system for the airborne MLS receiver, as compared with a warning system for an ILS receiver. In an ILS receiver a suitable warning system simply comprises a signal strength monitor for the beam r.f. carrier and a signal strength monitor for the beam modulation signal. A decrease in strength of either of the monitored signals below a tolerable amount for longer than a tolerable time causes a warning flag to appear on the pilot's course deviation indicator (CDI).

The time multiplex method of data transmission used in the MLS employs a standard signal format, later more fully described herein, in which the various functional beams, i.e. elevation and azimuth, are transmitted in a prescribed sequence. Each beam function is preceded by the transmission of a digital preamble which identifies the function to follow. In one such sequence, the time slots for beam transmissions are arranged in the following order: approach elevation; flare; approach azimuth; flare; approach elevation; back azimuth; approach elevation. The time slots for such functions are hereinafter referred to as "frames". The warning system for the MLS receiver must verify the validity of the data for each frame according to the below listed criteria. If valid data is not received for at least 45% of the frames for any function, a warning flag must be displayed to the pilot within one second of such failure.

A valid frame for any azimuth function is defined as one that satisfies all of the following requirements:
(1) Valid preamble.
(2) Scanning beams symmetrical to midscan time with ±40 microseconds.
(3) Rate of change of indicated angle less than 2 degrees/second.
(4) Beamwidth less than 4 degrees.
(5) Scanning beam (or clearance pulse) at least 2 dB greater than out-of-coverage (OCI) pulses during acquisition and validation modes (flagged), and greater than OCI pulses in tracking mode (unflagged).

A valid frame for the elevation function satisfies requirements (1) through (3), above, and the further requirement that beamwidth must be less than 2.5 degrees.

Upon start-up, a warning flag must be displayed until signal is acquired and the validity thereof is verified for at least 45% of the frames for any function. Display of the flag must continue in the acquisition or validation mode if the amplitude of a multipath signal is within 2 dB of scanning beam amplitude. A multipath signal is a signal produced by reflection of the beam by objects on the ground or by other aircraft. When validation occurs the receiver enters the tracking mode. In the tracking mode, the multipath amplitude is allowed to be 2 dB greater than the scanning beam amplitude without generating a warning.

An MLS receiver includes the necessary r.f., i.f. and detector circuits to detect the digital data and guidance information transmitted by the MLS ground facility. The receiver further includes A/D converters for converting the analog video signals detected from the directional beams to digital form, random access memories (RAM) for storing the digitized video signals and a microprocessor for processing the received data. In prototype units, as well as in the present invention, reception of a preamble to a beam function transmission, i.e. an elevation or azimuth scan, caused the microprocessor to interrupt data processing, test the preamble code for validity and store the digitized video signals generated by the beam scan according to the beam function and time of reception. After the end of interrupt, the microprocessor determines the times of reception of the peak video signals resulting from the TO and the FRO beam scans and calculates from such times the angular displacement of the receiver from the beam mid-scan position. The resultant data is then tested for validity against the above mentioned criteria. After reception of the first valid scan signals for a particular function, tracking gates are established around the time of reception of the TO and FRO peak video scan signals. The peak amplitudes of video signals for subsequent scans of the same particular function are compared for signals inside the tracking gates with signals outside the tracking gates to determine whether multipath signals are present and if so, whether such multipath signals are at an innocuous level.

In a prototype warning system the various validity checks and multipath amplitude comparisons were integrated into a system warning by a pair of counters one of which, the frame counter, was incremented each time a frame met all of the following criteria: valid preamble identification; tracking gates symmetrical about midscan; beam width within limits. The frame counter was decremented each time the rate of change of the indicated receiver displacement angle exceeded 2 degrees/second. The frame counter was automatically decremented at one half the frame data rate.

The second counter of the pair termed a confidence counter, was incremented each time the amplitude of the signal within the tracking gate exceeded the amplitude of any signals outside the tracking gate. The confidence counter was decremented each time the amplitude of any out-of-gate signal exceeded the amplitude of the in-gate signal.

A system warning flag was displayed until the frame counter accumulated a count corresponding to reception of 50% valid data frames and until the confidence counter reached a count corresponding to reception of in-gate signals for one second. Whenever the accumulated counts of both counters exceeded such thresholds, the warning flag was removed. After removal of the warning flag the confidence counter continued to accumulate count for about 20 seconds. The additional accumulation of count in the confidence counter allowed strong multipath signals to persist for as long as 20 seconds after acquisition of a direct path signal without generating a warning.

The prototype warning system lacked the desirable quality of hysteresis. The frame and confidence counters incremented and decremented count in a linear fashion whether accumulating count when in a flagged condition, towards the threshold at which the system warning flag is removed or decrementing count, when in an unflagged condition, towards that same threshold at which the system warning flag will be displayed. Such lack of hysteresis led to instabilities in the warning system when the quality of the received signals was only marginally within the validity acceptance criteria.

SUMMARY OF THE INVENTION

It is an object of the present invention to provide a warning system for an airborne MLS receiver which does not exhibit instabilities when operating with signals of marginally acceptable quality.

Briefly, the present invention is similar to the prototype warning system in that it comprises a pair of counters, a function validity counter and a multipath counter. The counters are controlled by the receiver microprocessor in an improved manner whereby when the function validity counter accumulates a count equal to a threshold value at which a function warning flag is removed, the counter is immediately set to a positive limit value. If the function warning flag has been removed, and the function validity counter counts down to the threshold value at which the function warning flag is set, the function validity counter is immediately set to a negative limit value. The multipath counter corresponds to the prior confidence counter. When the multipath counter accumulates count equal to the threshold at which the multipath warning flag is removed a constant equal to the threshold value is immediately added to the content of the multipath counter. After the multipath warning flag has been removed and the multipath counter counts down to the threshold, the multipath warning flag is set and the multipath counter is immediately cleared completely.

BRIEF DESCRIPTION OF THE DRAWINGS

FIGS. 1-A through 1-C are diagrams showing the standard signal format of the Microwave Landing System;

FIG. 1-D is a diagram of a typical function frame showing the order in which the signals thereof are transmitted;

FIG. 3-A and 3-B are diagrams showing the operation, respectively, of the function validity counter and the multipath counter of FIG. 2;

FIG. 4-A is a flow chart depicting the portion of the microprocessor program pertaining to the warning system of the invention; and FIGS. 4-B and 4-C, assembled, is a flow chart depicting a sub-program included in the program of FIG. 4-A.

DESCRIPTION OF THE PREFERRED EMBODIMENT

Referring to the drawings, the standard MLS signal format is illustrated in FIGS. 1-A through 1-B. Transmissions occur in alternating frame sequences, sequence #1—FIG. 1-A and sequence #2—FIG. 1-B. The approach elevation function is transmitted in the first frame 10 of sequence #1. The second frame 11 of that sequence is reserved for the flare function. In the third frame approach azimuth 12 is transmitted. The fourth frame 13 returns to the flare function and the fifth frame 14 returns to approach elevation. A basic data word is transmitted in frame 15 indicating that the next function to be transmitted is missed approach azimuth. A basic data word is transmitted in the eighth frame 17 and approach elevation and flare are respectively transmitted in the two remaining frames 18, 19 of sequence #1. In sequence #2 the functions are transmitted in the order shown in FIG. 1-B. The sixth frame 20 of sequence #2 is reserved for functions not yet provided in MLS, such as 360 degree azimuth. Transmission is therefore silent during this frame.

Not all of the functions shown in FIG. 1-A and 1-B are provided at every airport. For example, the flare function may not be provided. In such a case, the flare frames may be replaced by the approach azimuth function and basic data words, resulting in transmission of the approach azimuth function at triple the rate shown in FIGS. 1-A and 1-B. The basic data words provide information relating to particulars of an airport installation such as angular limits of azimuth coverage, beam width, antenna locations relative to the runway, etc. Sequence #1 and #2 are transmitted four times each with various intervals between the sequences to provide time for transmissions of 0, 1, 2, or 3 auxiliary data words, as shown in FIG. 1-C. The information contained in the auxiliary data words may relate to airport weather conditions, for example. The time required for transmission of a full cycle, FIG. 1-C, is 615 ms. Since the full cycle contains four each of sequences #1 and #2, data arrives at the receiver from the sequence pair at an average frequency of 6.5 Hz. Each sequence pair contains 6 approach elevation frames and 2 approach azimuth frames, if low-rate azimuth is provided, or 6 approach azimuth frames, if high-rate azimuth is provided. The elevation function data rate is therefore 39 frames/second and the azimuth function data rate is either 13 frames/second or 39 frames/second.

The arrangement of a typical function frame is shown in FIG. 1-D. At the beginning of a frame, a digitally coded preamble 21 is transmitted which includes the identification of the frame function. The preamble is followed by a sector signal inteval 22 during which various pulse signals are transmitted to provide out-of-coverage indication (OCI) and for test purposes. The remainder of the frame is devoted to a TO scan interval 23, pause interval 24 and the FRO scan interval 25.

Figure 1A:
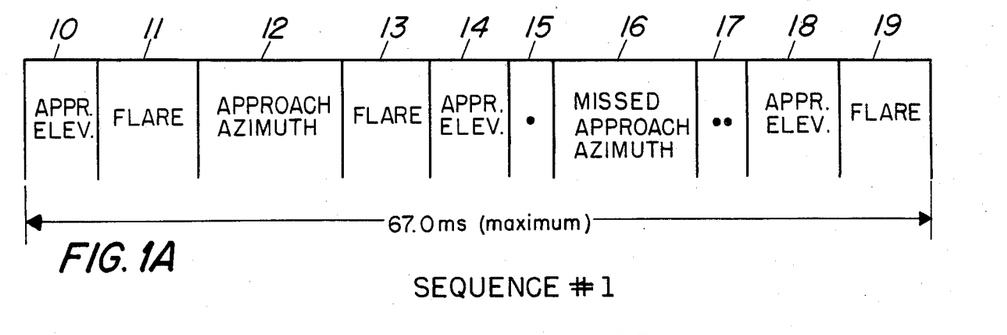
Figure 1B:
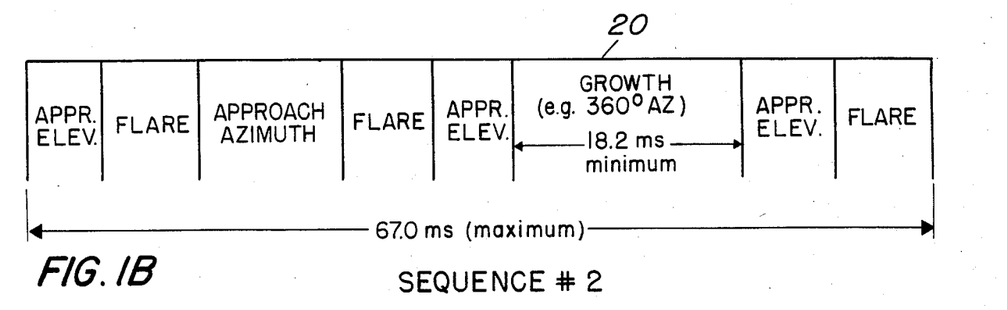
Figure 1C:
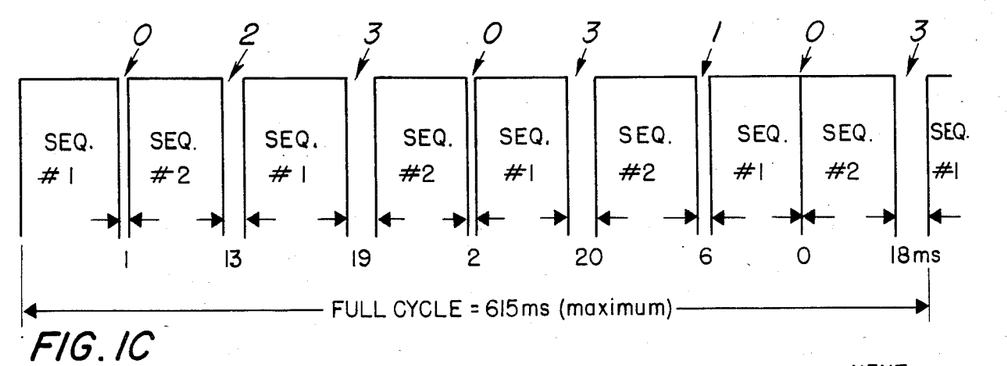
Figure 1D:
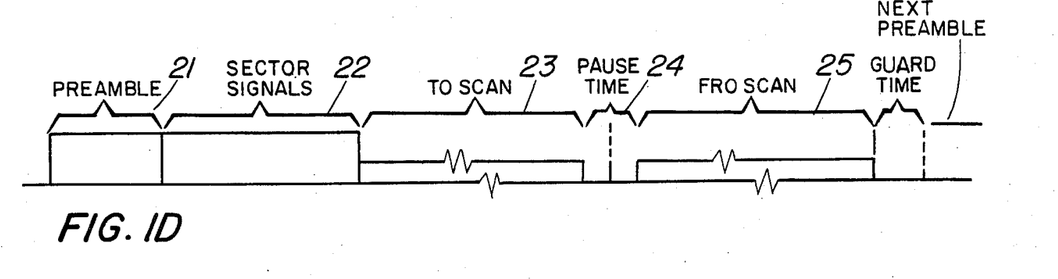
Figure 2:
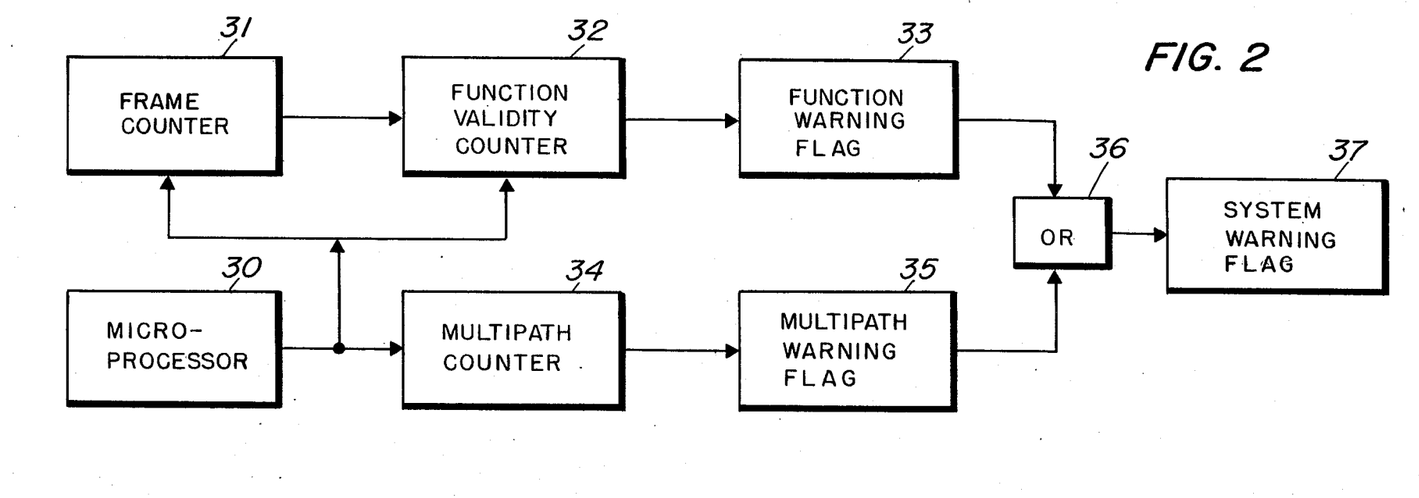
FIG. 2 is a functional block diagram of the warning system of the invention.

The warning system of the invention is shown in functional block diagram form in FIG. 2. The receiver microprocessor 30 tests each frame of the received video data for validity in accordance with a process described hereinafter. If the frame data is found valid, a frame counter 31 is set. A function validity counter 32 and a multipath counter 34 are provided for each function. That is, separate pairs of counters are provided for approach elevation, approach azimuth, etc. Counter 32 is initially set at a negative number and accumulates counts for each frame of valid data. As long as the accumulated count of counter 32 is below a threshold value, a function warning flag 33 is set. When the accumulated count of counter 32 reaches threshold value, the counter is set immediately to an upper constant limit and the warning flag 33 is removed. Warning flag 33 remains absent so long as the accumulated count of counter 32 is above threshold. Microprocessor 30 causes counter 32 to be decremented a net amount for each program cycle. Therefore, once warning flag 33 is removed and no valid data is received for a period of one second, counter 32 will have been decremented to the threshold value. Microprocessor 30 immediately sets counter 32 to its initial negative value and function warning flag 33 is set. Thereafter, valid data frames are required for a minimum period of one second to raise the accumulated count of counter 32 back to threshold and remove warning flag 33.

For each frame, microprocessor 30 tests the amplitude of in-gate video against the amplitude of out-of-gate video signals to determine the presence of multipath. If the in-gate signals are greater, counter 34 is incremented. Otherwise, counter 34 is decremented.

Counter 34 is initially set to zero and accumulates count for each frame wherein the in-gate signal is stronger. So long as the accumulated count of counter 34 is below a threshold value, a multipath warning flag 35 is set. When counter 34 reaches threshold, warning flag 35 is removed and a constant equivalent to one second is added to the contents of counter 34. If persistent multipath signals appear after warning flag 35 has been removed and the accumulated count of counter 34 is caused to be decremented to the threshold value, warning flag 35 is again set and microprocessor 30 immediately clears counter 34. Thereafter, in-gate signals must be stronger than out-of-gate signals for a minimum period of 1 second before warning flag 35 is again removed.

Warning flags 33 and 35 are combined by an OR logic gate 36 to control a system warning flag 37. If either warning flag 33 or warning flag 35 is set, system flag 37 will be set. System flag 37 is usually implemented as a flag visually displayed to the pilot on the face of the pilot's course deviation indicator.

Figure 3A:
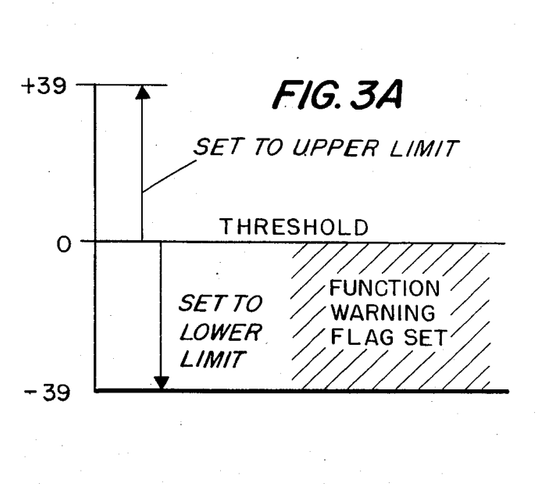
Figure 3B:
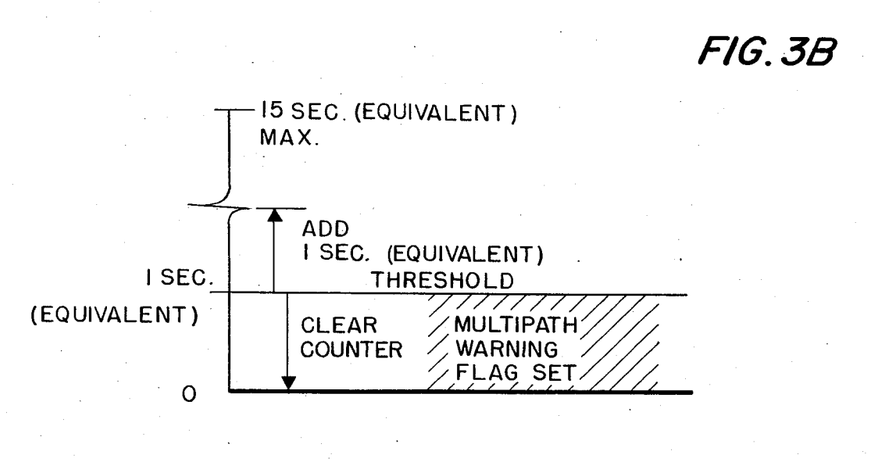

The operation of function validity counter 32 and multipath counter 34 in providing the desired hysteresis characteristic is shown in the diagrams of FIGS. 3-A and 3-B. Referring to FIG. 3-A, the function validity counter 32 is initially set to a lower limit value of $-39$ for all functions, i.e. approach elevation, approach azimuth, etc. The number 39 represents the maximum data rate encountered for any function, namely approach elevation and high rate azimuth. When frame counter 31 is caused to be set by a valid data frame a constant, the value of which depends upon the function involved, is added to the contents of function validity counter 32. For approach elevation and high rate azimuth, the value of the constant is 2. For low rate azimuth, the value of the constant is 6 and for back azimuth, the value is 12. Once each cycle of the microprocessor main program, a constant equal to 6 is subtracted from the contents of the function validity counter. The main program runs at the rate of 6.5 Hz. Therefore, if 100% valid frames are received in 1 second, the total number added to the function validity counter will be 78 while the total number subtracted from the counter will be 39 resulting in a net counter content of zero. The counter threshold is set at zero. When the counter content reaches zero, going in the positive direction, the microprocessor immediately sets the counter to an upper limit value of $+39$ and the function warning flag 33 is removed. Thereafter, if 100% valid data is received, the counter content will remain at the upper limit of $+39$. If signals should be lost completely for a period of 1 second, the counter contents will be reduced to a net value of zero by the subtraction step which occurs once every cycle of the microprocessor main program. The microprocessor then immediately sets the counter to the lower limit of $-39$ causing the function warning flag 33 to be set.

Operation of multipath counter 34 is illustrated by FIG. 3-B. Counter 34 is initially set to zero. The counter is either incremented or decremented by one count for each run of a function program, as is later described. The multipath counter threshold is set at a value equivalent to 1 second of the frame rate for the function involved. For approach elevation and high rate azimuth, the threshold value is $+39$. For low rate azimuth, the value is $+13$ and for back azimuth, the value is $+6$. Therefore, if all frames for a particular function are received clear of multipath interference for a period of 1 second, the threshold value of counter 34 will be reached. The microprocessor immediately adds a constant equal to the threshold value of counter 34 to the contents of that counter and causes the multipath warning flag to be removed. Counter 34 has a maximum limit equivalent to 15 seconds of the data rate of the function involved. For approach elevation and high rate azimuth, the maximum limit of counter 34 is 585.

Once counter 34 has accumulated sufficient count to clear the threshold, the time required for the counter to count down to zero depends upon the length of time signals free of multipath interference have been received. For example, if multipath signals become predominant just shortly after the accumulated count of counter 34 exceeds the threshold, the multipath signals must remain predominant for a minimum period of 1 second before the counter contents are reduced to the threshold value, causing the multipath warning flag 35 to be set and the multipath counter 34 to be cleared. If the signals received have been free of multipath interference for a period of 15 seconds or longer when the multipath signals become predominant, the multipath signals must remain predominant for 15 seconds before the contents of counter 34 are reduced to the threshold value.

Figure 4A:
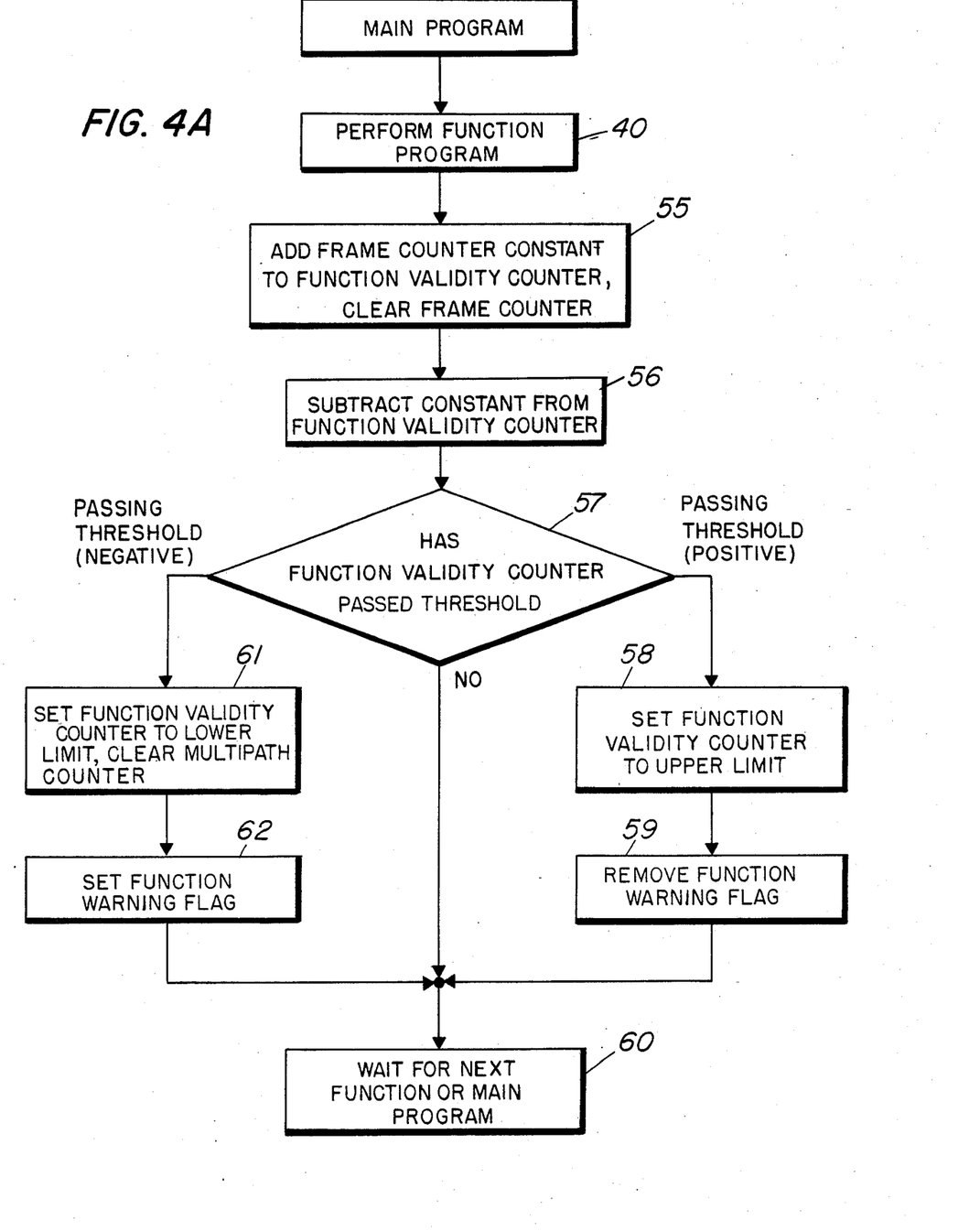
Figure 4B:
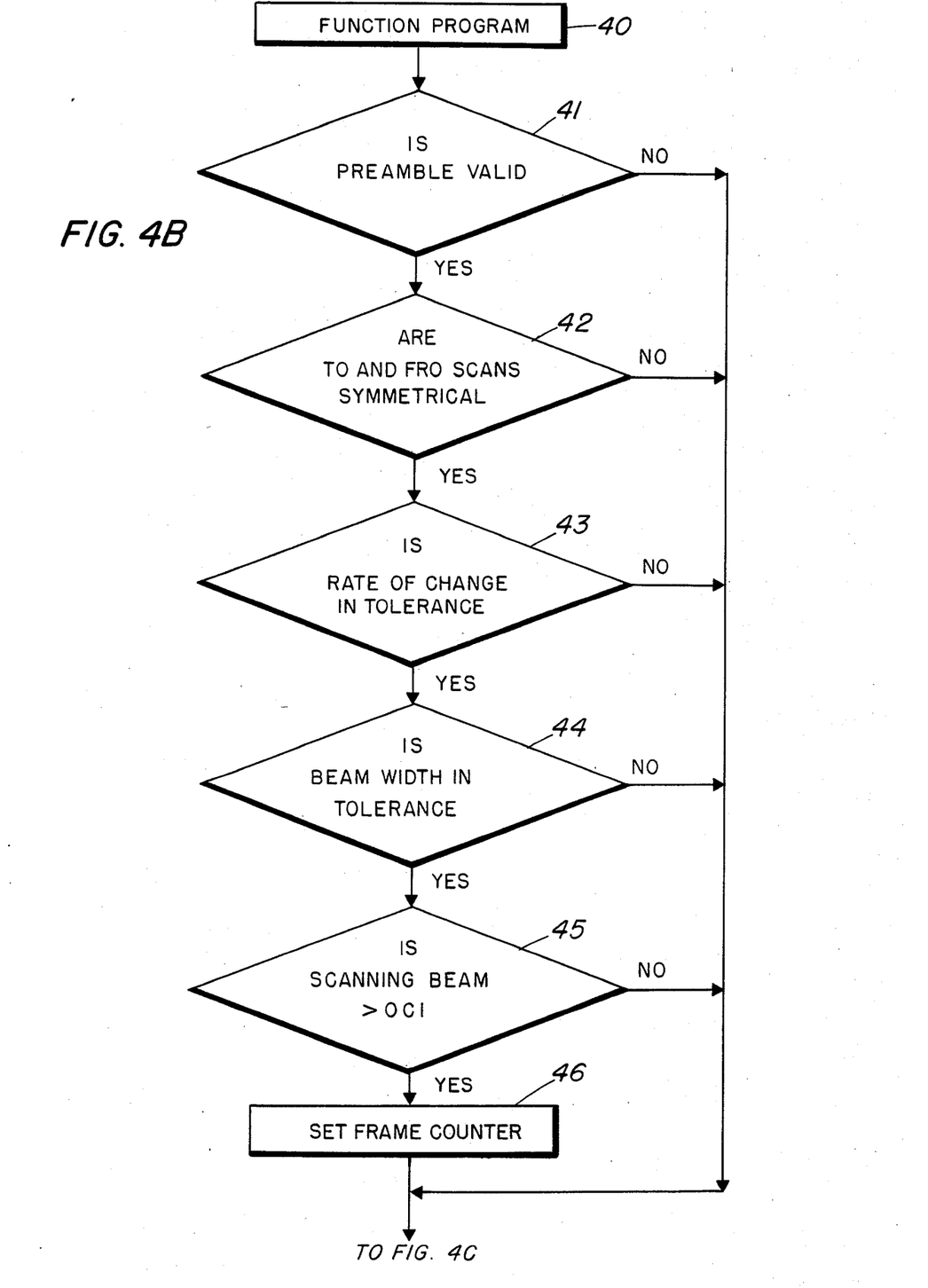
Figure 4C:
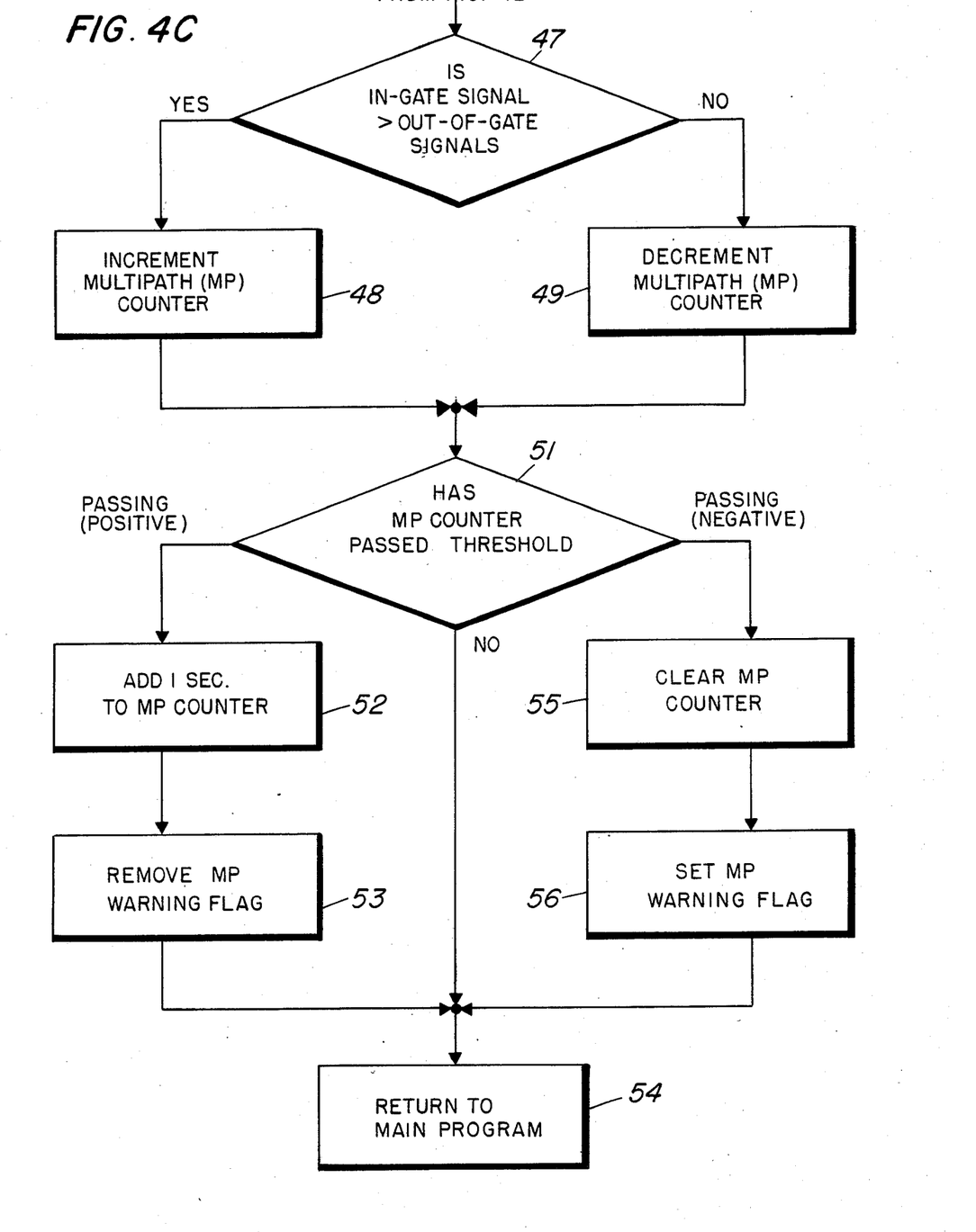

Counters 31, 32 and 34 of FIG. 2 are controlled by microprocessor 30 in accordance with the programs outlined in the flow charts of FIGS. 4-A, 4-B and 4-C. Referring to FIG. 4-A, after the microprocessor has computed the displacement angle for a function program, the function program 40 is called up. Referring to FIGS. 4-B and 4-C, the function program first tests at step 41, the frame preamble to determine whether the function identified by the preamble corresponds to the time slot assigned to such function in the signal format. If the preamble is found to be valid, the program steps to 42 where the beam centroid calculated for the TO scan is tested against the beam centroid calculated for the FRO scan for symmetry about the scan midpoint. If the scans are found to be symmetrical, the program steps to 43 where the displacement angle calculated for the current frame is compared with the displacement angle calculated for the previous frame to deterine the rate of change therein. If the rate of change of the indicated angle, i.e. the displacement angle, is found to be less than 2 degrees/second, the program steps to 44 where the width of the beam, as determined from the centroid calculations, is checked for tolerance. If the function involved is azimuth, such calculated beam width must be less than 4 degrees or if elevation, the calculated beam width must be less than 2.5 degrees. If the beamwidth is within tolerance, the program steps to 45 where the amplitude of the scanning beam signal is compared with the amplitude the OCI pulses received during the sector signal interval of the frame to determine whether the aircraft is located within the coverage area of the scanning beam. If the scanning beam amplitude exceeds the OCI pulse amplitude by a specified amount, frame counter 31 is set to a constant, the value of which depends upon the function involved. For elevation and high rate azimuth, the value of the constant is 2, for low rate azimuth, the value is 6, and for back azimuth, the value is 12. After the frame counter is set in step 46, the programmoves to decision block 47 (FIG. 4-C). If any of the tests of decision blocks 41-45 are failed, the program jumps to decision block 47.

In decision block 47 the peak amplitude of signal within the tracking gate is compared with the amplitude of all the signals received during the frame scan intervals. If the in-gate signal amplitude exceeds the amplitudes of all such other signals, multipath counter 34 is incremented one count in step 48. Otherwise, counter 34 is decremented one count in step 49. The program then moves to decision block 51 where the accumulated count of multipath counter 34 is tested to determine whether such count is below the threshold shown in FIG. 3-B or whether such count has exceeded or has dropped below the threshold since the last frame. If the accumulated count of counter 34 has exceeded the threshold since the last frame, the program branches to step 52 where a constant equal to one second of the frame rate of the function involved is added to the contents of counter 34. The multipath warning flag 35 is removed in step 53 and the function program returns to the main program in step 54.

Returning to block 51, if the contents of multipath counter 34 have dropped below the threshold since the last frame, the program branches to step 55, clearing counter 34 and then proceeds to set the multipath warning flag 35 in step 56. The function program then returns to the main program in step 54.

It will be understood that the reference characters assigned to the program steps diagramed in FIGS. 4-A, 4-B and 4-C are illustrative only and that such characters do not define the actual program lines or steps of the instruction code of microprocessor 30.

Referring to FIG. 4-A, after return to the main program from the function program 40, the constant, if any, to which frame counter 31 is set is added to the contents of the function validity counter 32 and the frame counter is cleared in step 55. Then once each cycle of the main program, which encompasses one sequence pair and occurs at the rate of 6.5 Hz, a constant equal to 6 is subtracted from the contents of function validity counter 32 in step 56. The program then moves to decision block 57.

In decision block 57, the accumulated count of counter 32 is compared with the counter threshold shown in FIG. 3-A and with the value of such count for the preceeding frame. If the value of such count is found to have passed the threshold since the preceeding frame, the program branches to step 58 where the function validity counter is set to the upper limit value of +39. Then the function warning flag 33 is removed in step 59 and the program waits to perform the next function program, if the main program has not been completed for all functions, or waits for the next main program, in step 60.

Returning to block 57, if counter 32 has dropped below the threshold since the preceeding frame, the program branches to step 61 which sets counter 32 to the lower limit (−39) and clears multipath counter 34. The function warning flag is set in step 62 and the program waits for the next function or main program, step 60. If the accumulated count of counter 57 has neither exceeded nor dropped below the threshold since the preceeding frame, the program waits for the next function or main program to be called, step 60.

The invention claimed is:

1. In a warning system for a microwave landing system airborne receiver, said warning system having a first counter which increments count for valid received signals and which decrements count for invalid signals, a first warning flag which is set as long as the accumulated count of said first counter is below a predetermined threshold; a second counter which increments count whenever the amplitude of signals being tracked by the receiver exceeds the amplitude of all other signals received and which decrements count whenever the amplitude of signals being tracked by the receiver does not exceed the amplitude of all other signals received; a second warning flag which is set as long as the accumulated count of said second counter is below a second predetermined threshold and a system warning flag for displaying a visual warning to the aircraft pilot whenever said first warning flag or said second warning flag is set;

the improvement which comprises:
means for initially setting said first counter to an initial lower limit below said first predetermined threshold;
means for setting said first counter to an upper limit above said first predetermined threshold whenever the accumulated count of said first counter changes from a value below said first predetermined threshold to a value above said first predetermined threshold; and
means for setting said first counter to said initial lower limit whenever the accumulated count of said first counter changes from a value above said first predetermined threshold to a value below said first predetermined threshold.

2. The improvement of claim 1 further including:
means for initially clearing said second counter of all accumulated count;
means for adding count equal to the value of said second predetermined threshold to the accumulated count of said second counter whenever the accumulated count of said second counter changes from a value less than said second predetermined threshold to a value greater than said second predetermined threshold; and
means for clearing said second counter of all accumulated count whenever the accumulated count of said second counter changes from a value greater than said second predetermined threshold to a value less than said second predetermined threshold.

3. The improvement of claim 1 further including:
means for incrementing said first counter by a first number wherein a valid signal is received; and
means for decrementing said first counter by a second number, said first counter being decremented at a constant rate, the value of the product of said first number and the rate at which signals are transmitted to the receiver being equal to twice the product of the value of said second number and said constant rate of decrementation of said first counter.

* * * * *